United States Patent [19]

Dinkins

[11] Patent Number: 4,659,878

[45] Date of Patent: Apr. 21, 1987

[54] METHOD AND APPARATUS FOR INTERFERENCE FREE COMMUNICATIONS BETWEEN A REMOTE HANDSET AND A HOST SUBSCRIBER UNIT IN A CELLULAR RADIO TELEPHONE SYSTEM

[75] Inventor: Gilbert M. Dinkins, Appomattox, Va.

[73] Assignee: General Electric Company, Lynchburg, Va.

[21] Appl. No.: 774,712

[22] Filed: Sep. 11, 1985

[51] Int. Cl.⁴ .......................................... H04M 11/00
[52] U.S. Cl. ........................................ 370/71; 455/17; 455/33; 379/60; 379/61
[58] Field of Search ........... 179/2 EA, 2 EB; 455/17, 455/33

[56] References Cited

U.S. PATENT DOCUMENTS

3,906,166 9/1975 Cooper et al. ................... 179/2 EB
4,363,935 12/1982 Toya .................................. 179/2 EA

Primary Examiner—Gene Z. Rubinson
Assistant Examiner—Mark E. Ham
Attorney, Agent, or Firm—Nixon & Vanderhye

[57] ABSTRACT

A method and apparatus for providing interference free rf communications between remote handsets and host subscriber units in a Cellular Radio Telephone System includes the use of data transmission and voice channels assigned by microprocessors to track the currently assigned base station/subscriber unit channel assignment—but offset therefrom by one channel thereby to reliably and automatically arrive at an interference free channel.

20 Claims, 8 Drawing Figures

FIG. 1
U.S. CELLULAR FREQUENCIES

FIG. 2
FREQUENCY ASSIGNMENT WITHIN A CELL

METHOD AND APPARATUS FOR INTERFERENCE FREE COMMUNICATIONS BETWEEN A REMOTE HANDSET AND A HOST SUBSCRIBER UNIT IN A CELLULAR RADIO TELEPHONE SYSTEM

FIELD OF THE INVENTION

The present invention relates to cellular radio telephone systems in which use of remote handsets can be made, while avoiding interference problems heretofore associated with remote telephone handsets.

BACKGROUND OF THE INVENTION

The use of remote wireless telephone handsets in wire line telephone service systems is well-known. The remote handsets typically operate on RF channels below 50 MHz at power levels below 100 mw. These instruments are sold in numerous retail store outlets and require no FCC frequency assignment. Accordingly, they usually fall on or near the same RF channel frequency, especially if they are manufactured and provided from a single supplier.

As a result, an interference problem typically occurs between remote handsets and tends to degrade the service provided in proportion to the number of remote handsets operating in a given service area. A further interference problem exists in that the normally operating services in these frequency bands, i.e., TV, police, CB, utilities, etc., because of their higher power and larger populations, can render the remote sets virtually useless. Thus, the use of remote handsets in conjunction with a host subscriber unit in a wireless cellular radio telephone system has up until now been assumed difficult to accomplish, in view of interference problems such as those above described with respect to the wireless remote handsets used in the context of wire-line systems.

Accordingly, although three tiered cellular radio telephone systems are well known, such as that disclosed in U.S. Pat. No. 3,906,166 to Cooper et al, a four tiered system using wireless remote handsets has up until now not been feasible.

SUMMARY OF THE INVENTION

The present invention overcomes the above described interference problems in the context of a wireless cellular system. More specifically, the present invention assures interference free wireless communication between a remote handset and a host subscriber unit by automatically assigning clear frequencies (in that particular cell) already within the cellular radio telephone frequency plan.

Figure 1:
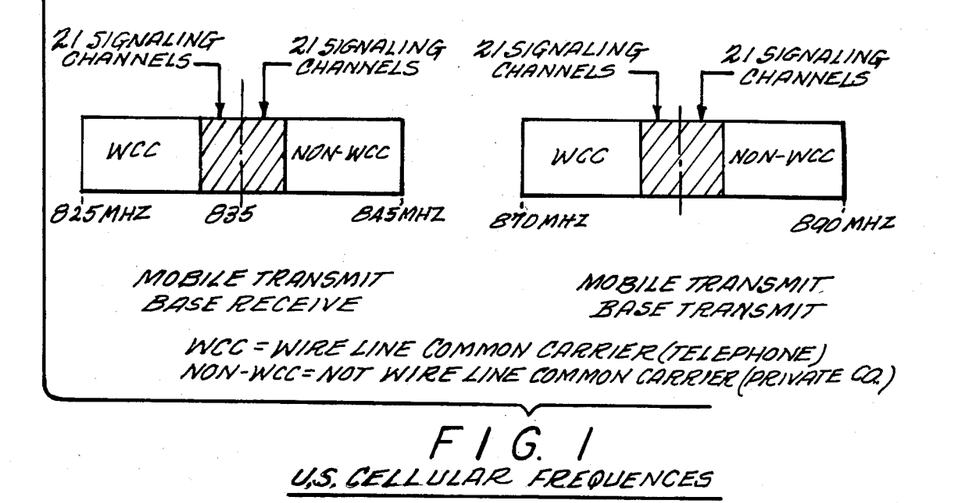
FIG. 1 shows the FCC frequency assignments in cellular radio telephone systems.
Figure 2:
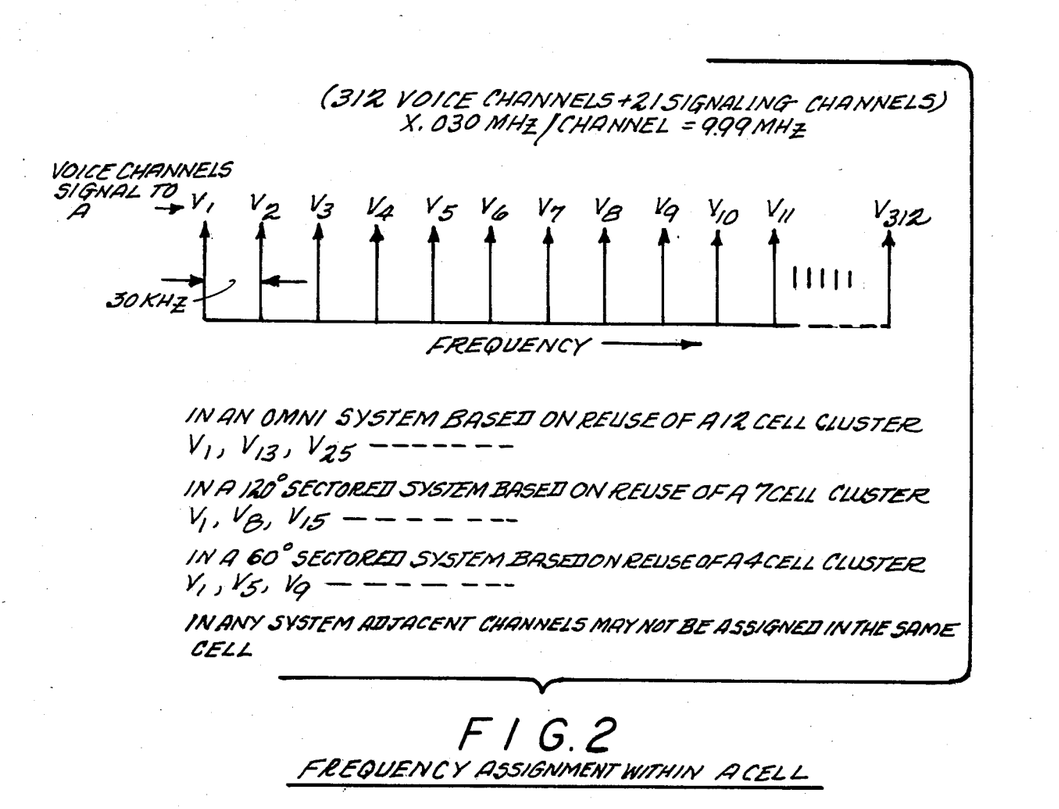
FIG. 2 shows the FCC frequency assignments within a given cell of a cellular radio telephone system.

FIG. 1 shows FCC frequency assignments for the U.S. cellular radio telephone system and FIG. 2 shows the assignment of frequencies within a given cell. It should be particularly noted that, within any given cell, adjacent channels are not normally utilized. Now, however, I propose to purposefully utilize these guaranteed "clear" channels for a relatively lower powered wireless link between a remote handset and its host subscriber unit (which may itself be a mobile unit).

In order to achieve a reliable and good grade of service, the communications between handset and subscriber unit must be interference free, as has been noted above. The present invention automatically assigns frequencies of operation between the handset and subscriber unit on a clear voice channel within the assigned cellular voice channels for a given cell. Thus, the cellular radio telephone system envisaged by the present invention exhibits a four tier structure including the interconnected wire line telephone networks, the fixed cell base station, the wireless mobile subscriber unit and a wireless remote handset. As noted above, it is the fourth tier, i.e., the interference-free use of remote handsets, which the present invention now allows for the first time.

In order to effect interference free communications between a remote handset and a subscriber unit in the cellular radio telephone system, the subscriber unit and remote unit incorporate cooperative structures for automatically performing several successive steps. When calling a number from the remote handset, the number to be called is first entered via the key pad of the handset. Subsequently, the send button on the handset is depressed in order to load the address of the subscriber unit and the called number into the subscriber unit. This data may be loaded between the remote handset and the subscriber unit over a fixed assigned frequency data link (at least initially), the use of which may avoid significant interference (e.g. because of error checking protocol and the fact that only a short burst of digital data is involved). The subscriber unit then passes a proper serial number, ID number and the called number to its assigned cell base station in the usual manner, upon recognition of its proper address as received from the handset. In response thereto, the assigned cell base station transmits assignment of a voice channel frequency to the subscriber unit (in the usual manner), which in turn, transmits this data offset by a predetermined amount (i.e. to an adjacent and therefore unused channel) over the fixed remote-subscriber data link to the remote handset. In this manner, the voice frequency assignment, which is related to the subscriber unit voice channel frequency by predetermined plus or minus increments (of for example one channel width or 30 kHz), is provided to the handset in order to establish high quality wireless voice communications from the handset through the intervening tiers of processes to the switched telephone network.

Hand-off within the cellular radio telephone system (which may occur conventionally down to the subscriber unit level) is handled in the present invention by also transmitting a new handset voice channel offset frequency assignment (along with a proper handset address) to the handset over the fixed remote-subscriber data link at essentially the same time that the subscriber unit receives its new frequency assignment from the cellular radio telephone system controller (via a cellular base station). Alternatively, the new hand-off voice channel frequency assignment can be transmitted to the handset over the then existing voice channel frequency.

When a call is being routed from the switched telephone network through to the remote handset of the cellular radio telephone system, the subscriber unit first conventionally receives a page (or call) from the cellular radio telephone system controller (via an appropriate base station). The call includes voice frequency assignment data. The subscriber unit may then pass the voice frequency assignment data to the handset over a fixed preassigned data link in order to once again establish wireless voice communications to the handset on an adjacent (and therefore unused) channel. Hand-off can still occur as previously described above.

In another preferred embodiment of the invention, the fixed (remote-subscriber) data link can be one of the unused cellular frequencies, thereby allowing the same handset transmitter and receiver used for voice channel communications to be used to set up the calls and voice frequency assignments. This obviates the need for a separate data link receiver and transmitter in the handset. After the initial voice channel is assigned, further data communications, i.e., handoff, can be conducted on the then existing voice channel assignment as has already been described above.

Accordingly, the present invention avoids unpredictable interference when using remote wireless handsets in a cellular radio telephone system, by causing the remote-subscriber unit RF voice link to dynamically track (offset by one or more channel) the assigned frequency of the subscriber unit which, in turn, is always under control of the cellular system controller. The remote link frequencies thus track but are always automatically offset to unused channels in the cell in which the subscriber unit is located. The present invention therefore allows use of a relatively simple handset since the major reference oscillator, audio processing, operational software, and vertical services software remain in the associated subscriber unit. Thus, low power transmitters, receivers and logic circuits need only be provided in the handset, allowing for the use of smaller batteries and longer battery life. Indeed lower RF power is desirable for the remote link because it is operating on a channel which is supposed to remain clear insofar as other subscriber units are concerned. Since the handset need have only simplified electronics, it may therefore be styled in a small and user friendly package.

DETAILED DESCRIPTION OF THE PRESENT INVENTION

Figure 3:
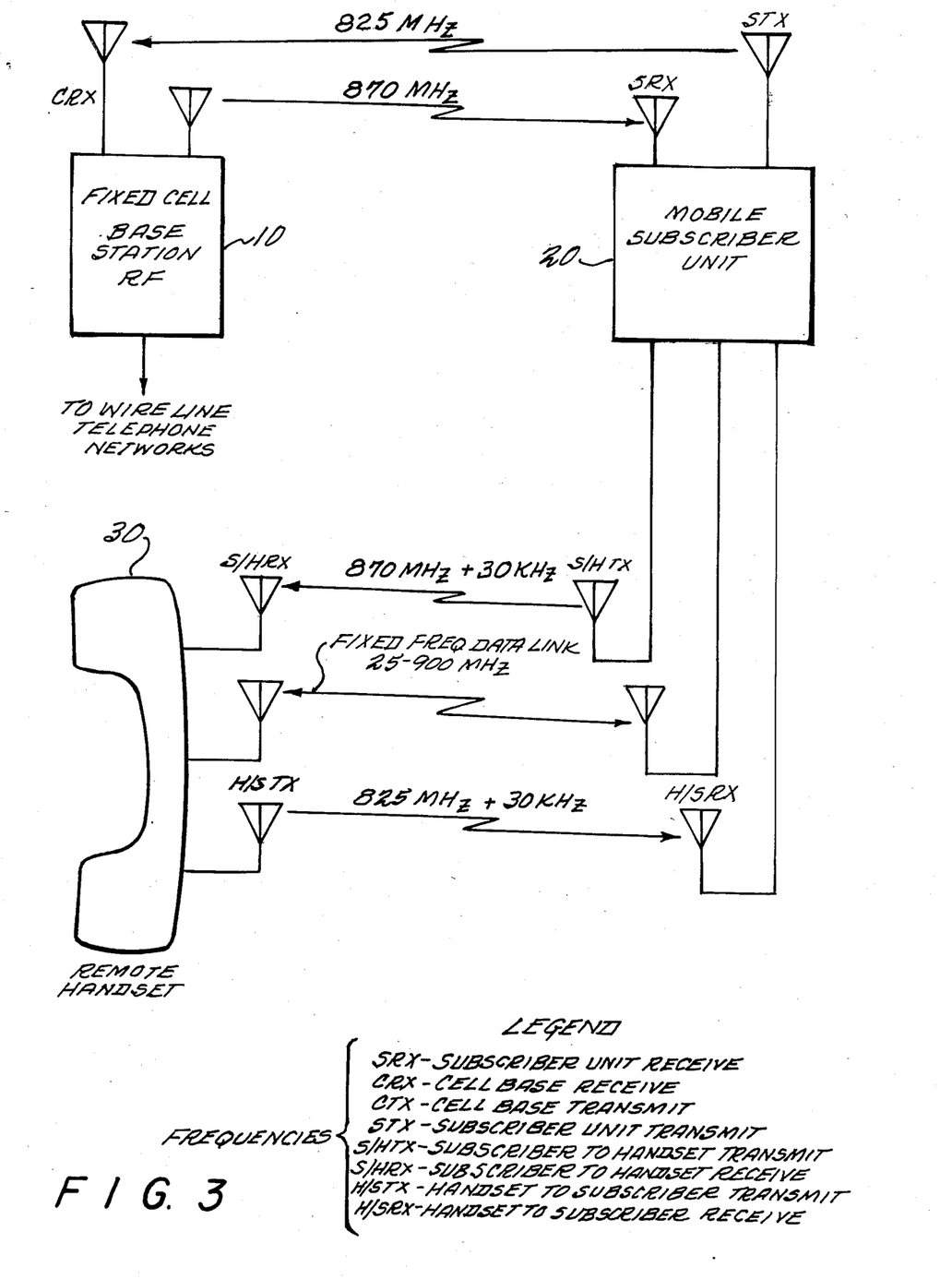
FIG. 3 shows an exemplary schematic diagram of the four-tiered communication links involved in usage of the present invention.

FIG. 3 schematically shows a four tiered cellular radio telephone system according to the present invention. A fixed cellular base station 10 conventionally communicates with the cellular controller and the switched telephone wireline network and, via a wireless link, with a mobile subscriber unit 20. The mobile subscriber unit 20 communicates both with the fixed cell base station 10 and a remote handset 30 via wireless links. Transmit and receive channels are schematically shown between the base station 10 and subscriber unit 20. Transmit and receive channels and a fixed frequency data link are schematically shown between remote handset 30 and subscriber unit 20. As shown in FIG. 3, the transmission and receive frequencies between handset 30 and subscriber unit 20 are related to the transmit and receive frequencies between base station 10 and subscriber unit 20. More specifically, the frequency assignments between handset 30 and subscriber unit 30 are offset by plus or minus 30 kHz (one cellular channel) as compared to the transmit and receive frequencies between base station 10 and subscriber unit 20.

Figure 4:
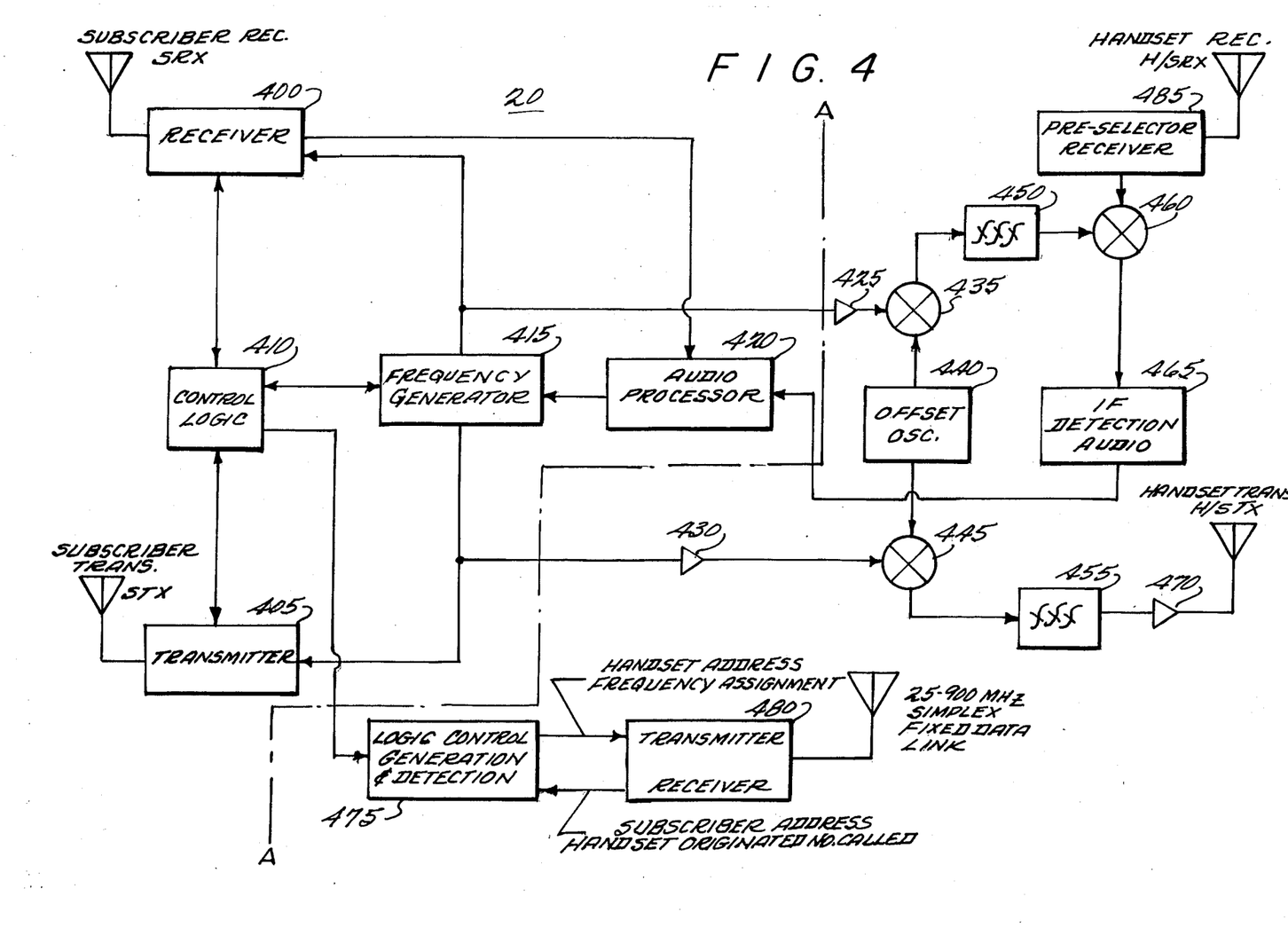
FIG. 4 shows a schematic diagram of a typical subscriber unit according to the present invention.

FIG. 4 is a schematic diagram showing in greater detail subscriber unit 20 of FIG. 3. It is, in essence a conventional cellular subscriber unit —but having a wireless voice transmit/receive link to a handset and suitable computer programmed controls also to effect limited control data communications with the remote handset. More specifically, subscriber unit 20 is shown to comprise receiver 400 and transmitter 405 connected to control logic 410, receiver 400 also being connected to audio processor 420. Control logic 410, in turn, is connected to frequency generator 415, which is connected to receiver 400 and transmitter 405, and logic control generation and detection 475 which may comprise a programmed control computer (or part thereof). Frequency generator 415 is connected to buffer amplifiers 425 and 430 and audio processor 420. The buffer amplifiers 425 and 430 are respectively connected to mixers 435 and 445, which in turn receive outputs from offset oscillator 440. Mixers 435 and 445 are respectively connected to filters 450 and 455. The output of filter 455 is provided to a buffer amplifier 470. The output of filter 450 is provided as one input to a mixer 460, which receives as a second input the output from pre-selector receiver 485. The output of the mixer 460 is provided to IF detection audio 465 which provides an output to audio processor 420. The logic control generation and detection 475 outputs a signal to and receives a signal from transmitter/receiver 480.

The components to the left of broken line A—A comprise nothing more than the typical components making up a conventional host subscriber unit of a cellular radio telephone system. The components to the right of broken line A—A, however, are those components necessary for providing the fourth tier of the cellular radio telephone system according to the invention. For example, offset oscillator 440 together with mixers 435 and 445 provides the plus or minus increments (i.e., one channel width or 30 kHz.) relation between the host subscriber unit transmit and receive frequencies and the remote handset transmit and frequencies provided by frequency generator 415, as will be readily appreciated by those skilled in the art. Preselector receiver 485, mixer 460, and IF detection audio 465 constitute the front end portion of a receiver for receiving rf signals from the handset and cooperate with the offset oscillator 440, mixer 435 and frequency generator 415 for arriving at the proper host subscriber unit offset frequency. Offset oscillator 440, mixer 445 and frequency generator 415 cooperate to transmit the proper offset frequency to the remote wireless handset. The filters 450 and 455 are wide band filters and more specific filtering, i.e., selection of the proper offset frequency takes place in the logic control of the handset.

The logic control generation and detection 475 and transmitter/receiver 480 comprise the subscriber unit portion of the fixed data link for passing and receiving frequency assignment data between the subscriber unit 20 and remote handset 30. Although logic control generation and detection 475 and control logic 410 have been shown as separate components, these components could be incorporated into a single device programmed to perform the functions of the two separate components.

Figure 5:
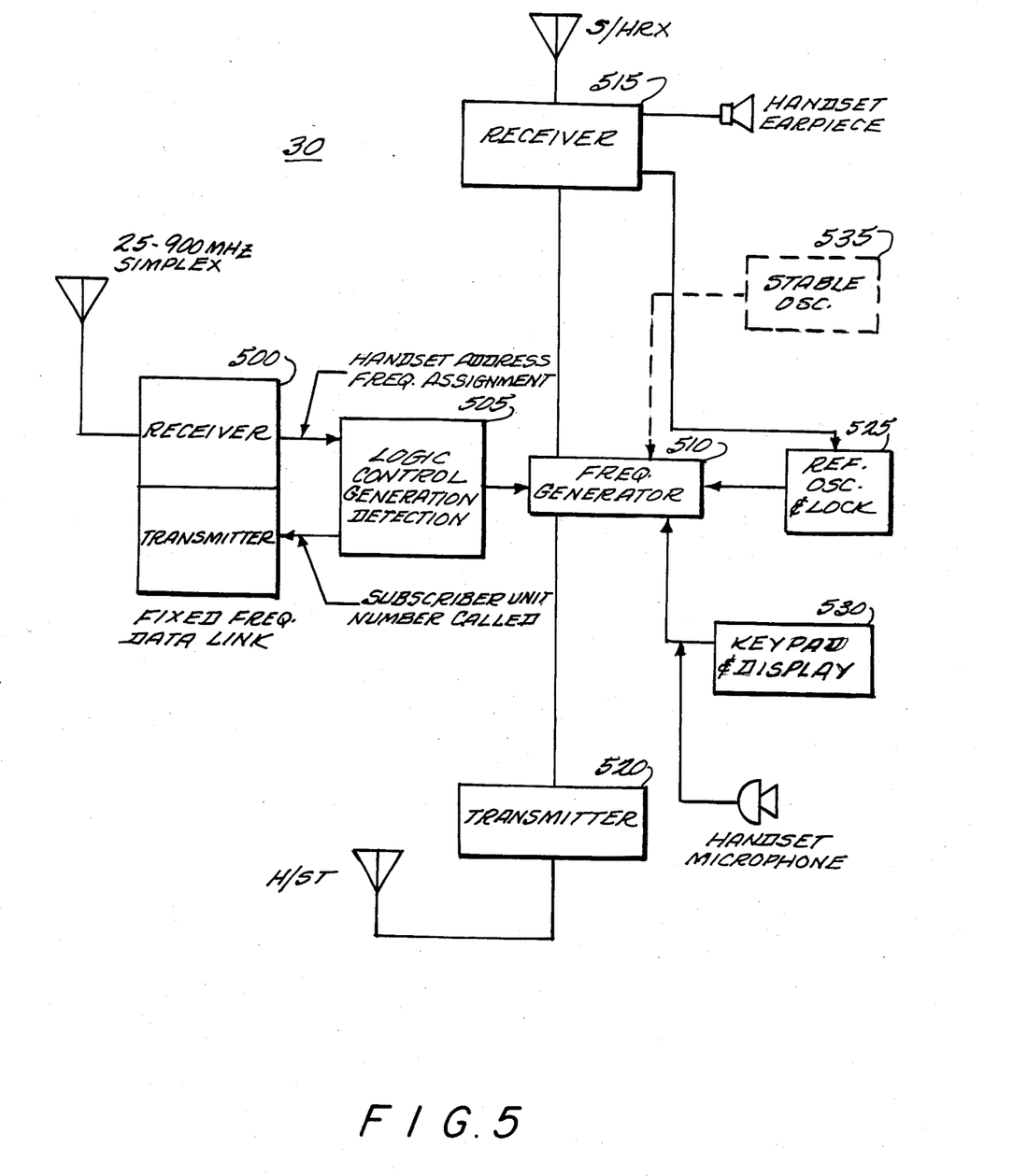
FIG. 5 shows a schematic diagram of a typical remote handset, according to the present invention.

Remote handset 30 is shown in greater detail in FIG. 5, to comprise transmitter/receiver 500 connected to logic control generation detector 505 (which may comprise a suitably programmed control computer, e.g. microprocessor), which is in turn connected to frequency generator 510. Frequency generator 510 is in turn connected to receiver 515, transmitter 520, key pad and display 530 and reference oscillator and lock 525, which is in turn connected to receiver 515. Alternatively, in place of the reference oscillator and lock 525 a stable oscillator 535 can be connected to frequency generator 510 as shown in broken lines in FIG. 5. From the above, it should be clear that the structure of handset 30 is that of a simple transceiver and thus is very much simplier than that of subscriber unit 20. Although logic control generation and detection 505 and frequency generator 510 are shown in FIG. 5 as separate components, these components can be incorporated into a single device programmed to perform the functions of the two separate components.

The operation of the subscriber unit/remote handset linkage will now be described with reference to the flow charts shown in FIGS. 6-8. As will be appreciated, these flow charts may be used to derive suitable computer programs to achieve the control functions of logic control 475 (in the subscriber unit) and logic control 505 (in the remote handset).

Figure 6:
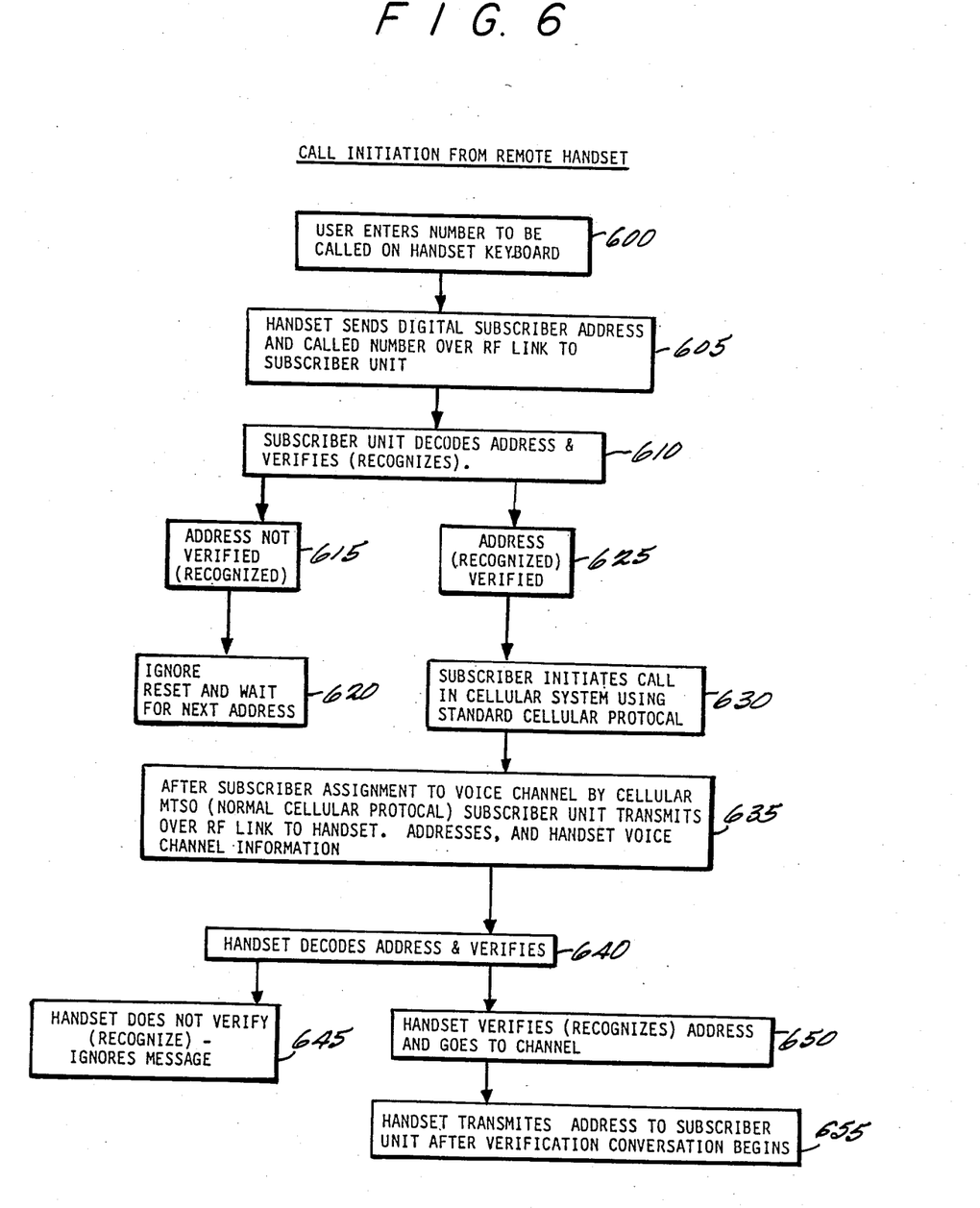
FIG. 6 is a flow chart describing typical operation of the present invention when a call is initiated from the remote handset and thus depicts exemplary computer program control functions to be implemented in the subscriber unit and in the remote handset.

FIG. 6 is a flow chart describing the operation of the present invention when a call is initiated from remote handset 30. In first step 600, the user enters the number to be called onto the handset keyboard. Subsequently, in step 605, the handset transmits the proper associated subscriber unit address and called number over the fixed RF link to subscriber unit 20. In step 610, subscriber unit 20 decodes the transmitted data from the handset and verifies the accuracy of the data. If the address received from the handset is not verified in step 615, then the subscriber unit ignores the message and resets in order to await for the next transmitted address, as shown in step 620. As will be appreciated, this step will avoid interference between closely situated remote units associated with different subscriber units.

If, however, the subscriber unit 20 decodes its proper address, as shown in step 625, then the subscriber unit conventionally initiates a call in the cellular radio telephone system using standard cellular protocol, as shown in step 630. As shown in step 635, after subscriber unit assignment to a voice channel frequency by the cellular controller, subscriber unit 20 transmits a data burst over the fixed RF link to handset 30 the handset address (again to avoid possible interference with other closely situated remote handsets) and handset voice channel assignment information (assigning the handset to use the appropriate adjacent channel to that then being used by the base station/subscriber unit linkage). Subsequently, in step 640, handset 30 decodes the received address and verifies its accuracy. If the handset address received is not verified then, in step 645, the handset ignores the received message. However, if the handset verifies the received address as its own in step 650, then the handset transmits its address back to subscriber unit 20 (i.e. a form of "handshake") in order to initiate voice conversation over the handset/subscriber unit link, as shown in step 655.

Figure 7:
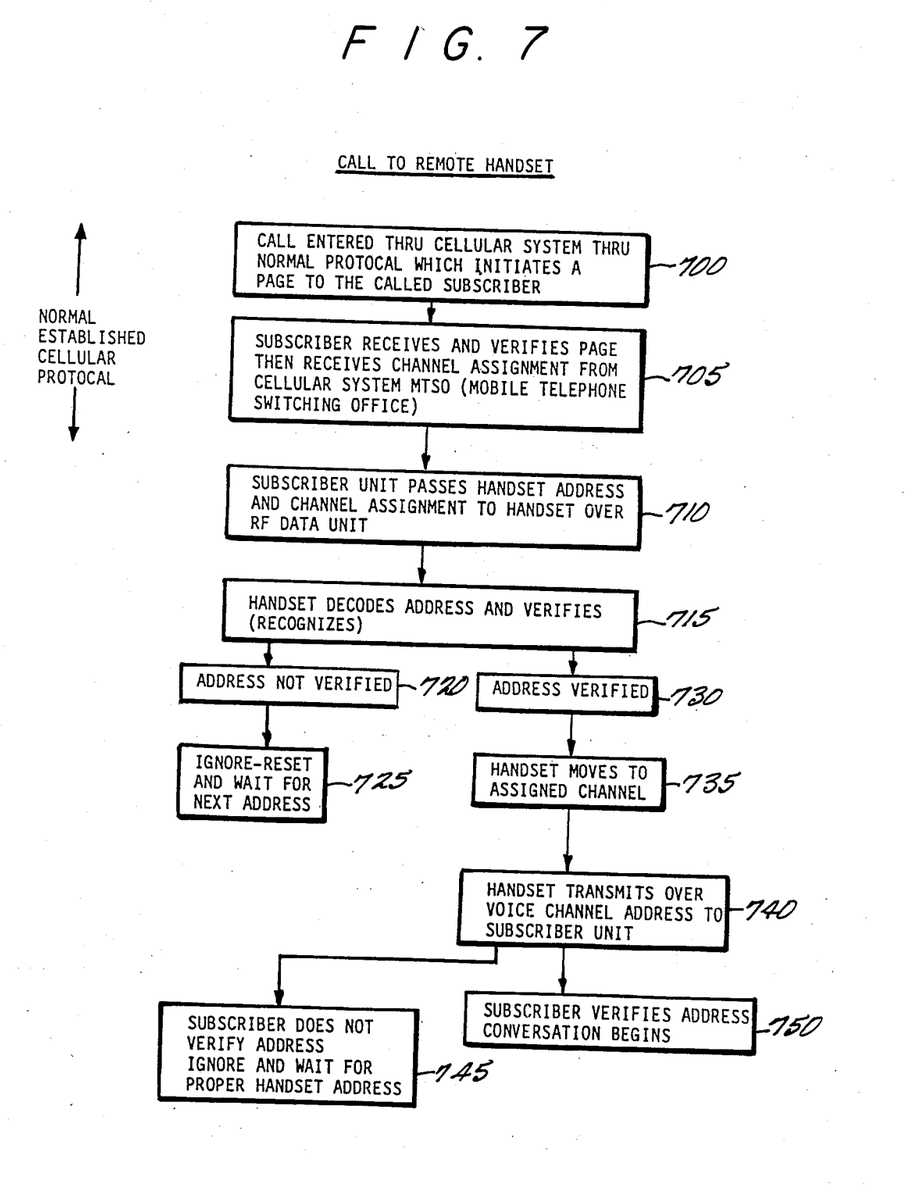
FIG. 7 is a flow chart describing typical operation of the present invention when a call is placed to the remote handset and thus depicts exemplary computer program control functions to be implemented in the subscriber unit and in the remote handset.

FIG. 7 is a flow chart showing operations when a call is made to remote handset 30. In first step 700, a call entered through the cellular system, through normal protocol, initiates a page to subscriber unit 20. In a subsequent step 705, subscriber unit 20 receives and verifies the page and then conventionally receives frequency channel assignment data from the cellular system mobile telephone switching office. In a subsequent step 710, subscriber unit 20 passes the proper handset address and the just received frequency channel assignment (plus or minus the required offset) to handset 30 over the fixed RF data link. In step 715, handset 30 decodes and verifies the received address. If the address is not verified, as shown in step 720, then the handset ignores the received message and resets in order to await the next received address, as shown in step 725. If the received address in step 715 is verified in step 730, then the handset moves to the assigned channel in step 735. In a subsequent step 740, handset 30 transmits over the assigned voice channel its address to subscriber unit 20. If the subscriber unit does not verify the address, in step 745, then the unit ignores the message and awaits a proper handset address. If, however, the subscriber unit verifies the received address in step 750, then voice conversation is initiated with the subscriber unit now operating, in essence, as an rf repeater.

Figure 8:
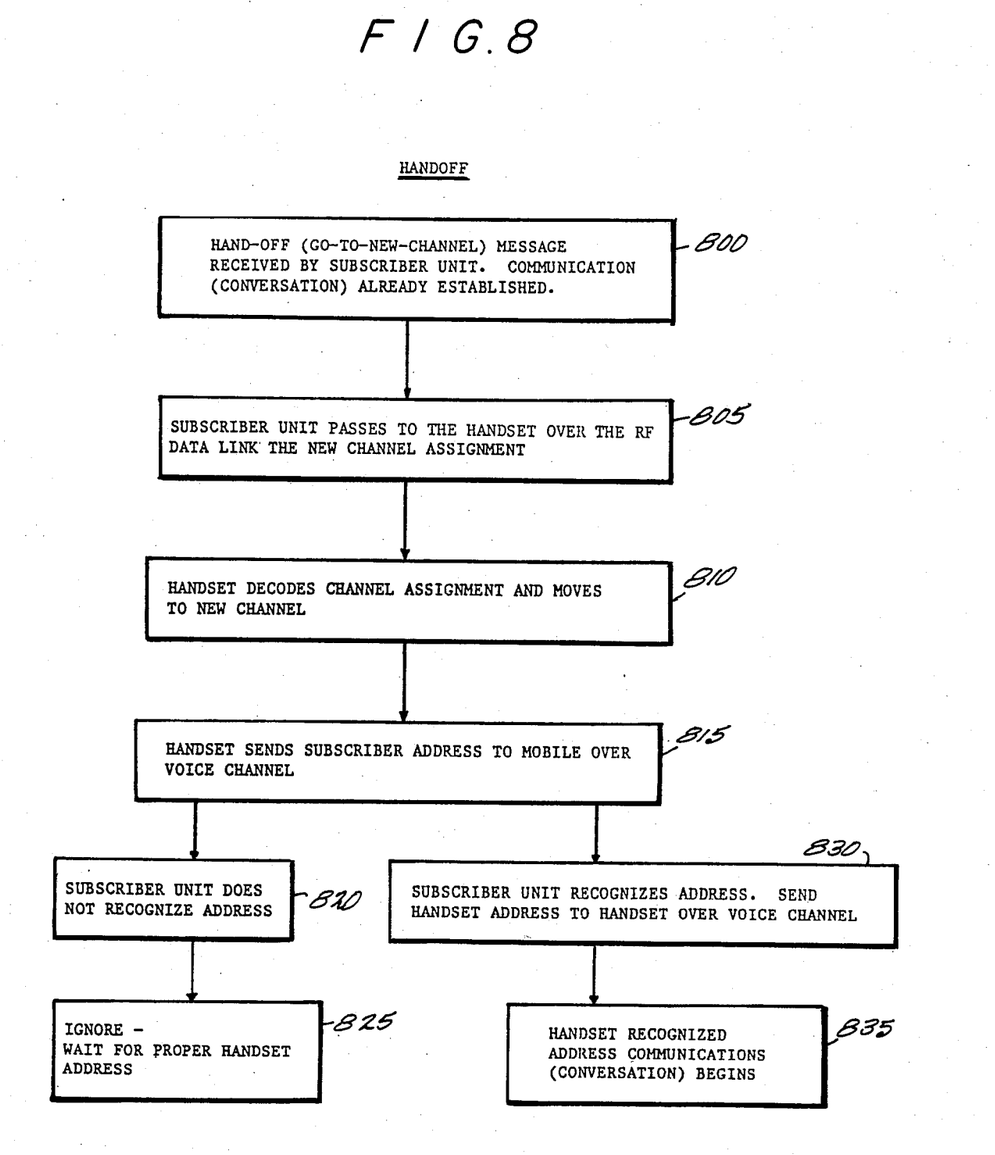
FIG. 8 is a flow chart describing a typical hand-off operation, in the cellular radio telephone system of this invention and thus depicts exemplary computer program control functions to be implemented in the subscriber unit and in the remote handset.

FIG. 8 depicts a hand-off operation in the cellular radio telephone system using the present invention. In first step 800, a conventional hand-off message is received by subscriber unit 20. It should be noted, that communication, i.e., voice conversation has already been established. In a subsequent step 805, subscriber unit 20 passes to handset 30, over the fixed RF data link, the proper new channel assignment. In step 810, handset 30 decodes the channel assignment and moves to the new channel. In a subsequent step 815 handset 30 sends the proper subscriber address to subscriber unit 20 over the voice channel. If subscriber unit 20 does not recognize its address in step 820, then subscriber unit 20 ignores the message and awaits a proper address, as shown in step 825. If the subscriber unit recognizes its address in step 830, it then sends the handset address to handset 30 over the voice channel. In a subsequent step 835, the handset recognizes its address and voice communications, i.e., voice conversation, is reinitiated essentially without noticeable interruption.

It should be appreciated that the above-described description of the presently preferred embodiment does not limit the scope of the present invention in any way, and that various changes and modifications may be made without departing from the spirit and scope of the present invention. For example, instead of a fixed RF data link, an unused cellular frequency can be employed. As noted above, this eliminates the need for a separate data link receiver and transmitter in the handset. Or, after the initial handshake and handset frequency assignments are completed, the fixed data link may be shut down and all subsequent hand-off assignments may be made on the handset-subscriber unit voice channel. Other variations and modifications will be apparent to those skilled in the art.

What is claimed is:

1. In a mobile cellular radio telephone subscriber unit capable of voice communications with an assigned cellular base station over an assigned rf frequency channel, the improvement comprising:

offset rf communications channel transceiver means for voice communications over an offset rf frequency channel which differs by a predetermined frequency from said assigned rf frequency channel; and control data link means for transmitting by rf, data representing said offset frequency channel.

2. An improved mobile cellular radio telephone subscriber unit as in claim 1 wherein said offset channel is a cellular radio channel adjacent said assigned rf frequency channel.

3. An improved mobile cellular radio telephone subscriber unit as in claim 1 wherein said control data link means utilizes a predetermined and fixed frequency rf communication link.

4. An improved mobile cellular radio telephone subscriber unit as in claim 1 further comprising:

a wireless handset unit having rf transceiver means for establishing voice communication with said subscriber unit over said offset rf frequency channel in response to data received from said control data link means.

5. An improved mobile cellular radio telephone subscriber unit as in claim 4 wherein predetermined address data is associated with the subscriber unit and with its associated handset unit and further comprising cooperative control means in the handset unit and in the remaining portions of the subscriber unit for exchanging and verifying such address data before establishing voice communications over said offset rf frequency channel.

6. An improved mobile cellular radio telephone subscriber unit as in claim 4, wherein said wireless handset unit comprises a keypad and display for initiating a call to the subscriber unit.

7. An improved method for voice communications using a mobile cellular radio telephone subscriber unit with an assigned cellular base station over an assigned rf frequency channel, the improved method comprising the steps of:

transmitting and receiving voice communications over an offset rf frequency channel which differs by a predetermined frequency from said assigned rf frequency channel; and transmitting by rf data representing said offset frequency channel.

8. An improved method for voice communications using a mobile cellular radio telephone subscriber unit, as in claim 7, further comprising the step of selecting said offset channel as a cellular radio channel adjacent said assigned rf frequency channel.

9. An improved method for voice communications using a mobile cellular radio telephone subscriber unit, as in claim 7, further comprising the step of establishing voice communication with said subscriber unit over said offset rf frequency channel with a wireless handset unit having rf transceiver means, in response to data received using a control data link means.

10. An improved method for voice communications using a mobile cellular radio telephone subscriber unit, as in claim 9, further comprising the step of exchanging and verifying predetermined address data associated with the subscriber unit and its associated handset unit in accordance with a cooperative control means in the handset unit and in the remaining portions of the subscriber unit over said offset rf frequency channel.

11. A method for obtaining interference free rf communications between a remote handset having a preassigned address and a subscriber unit having a preassigned address in a cellular radio telephone system having voice channel frequencies assigned by a centralized controller, said method comprising the steps of:

entering a telephone or other subscriber identifying number to be called on a key pad of said handset;

depressing a send button on said handset and thereby loading the address of said subscriber unit and said called number into said subscriber unit over an rf data link;

passing a proper serial number, ID number and call number from said subscriber unit to its assigned cell base station upon said subscriber unit's recognization of its address received from said handset;

receiving assignment of a voice channel from said assigned cell base station;

offsetting the frequency of said voice channel assignment by a predetermined frequency amount; and transmitting, from said subscriber unit to said handset over said data link, the handset address and said offset voice channel assignment in order to establish interference-free voice communications between said handset and said subscriber unit.

12. The method of claim 11 further comprising the step of handing-off, in the cellular radio telephone system, wherein the handset address along with a new offset handset voice channel frequency is transmitted to said handset over said data link in response to receipt by said subscriber unit of a new voice channel frequency from said cellular radio telephone system controller.

13. The method of claim 11 further comprising the step of handing-off, in the cellular radio telephone system, wherein the handset address along with a new offset handset voice channel frequency assignment is transmitted to said handset over the then existing voice channel frequency assignment at substantially the same time said subscriber unit receives said new voice channel frequency from said cellular radio telephone system controller.

14. The method of claim 11, wherein said data link comprises a fixed frequency rf data link.

15. The method of claim 11, wherein said data link comprises an unused voice channel.

16. A method for obtaining interference free communications between a subscriber unit having an address and a remote handset having an address, used in a cellular radio telephone system having a central controller, said method comprising the steps of:

transmitting a call from said cellular radio telephone system controller to said subscriber unit, said call including voice frequency assignment data;

offsetting the frequency of said voice frequency assignment data by a predetermined frequency; and passing said offset voice frequency assignment data from said subscriber unit to said handset over an rf data link to establish voice communication to said handset on said offset voice frequency assignment.

17. The method of claim 16 further comprising the step of handing-off, in the cellular radio telephone system, wherein the handset address along with a new offset handset voice channel frequency is transmitted to said handset over said rf data link in response to receipt by said subscriber unit of new voice channel frequency from said cellular radio telephone system controller.

18. The method of claim 16 further comprising the step of handing-off, in the cellular radio telephone system, wherein the handset address along with a new offset handset voice channel frequency is transmitted to said handset over the voice channel frequency used to establish voice communications in response to receipt by said subscriber unit of a new voice channel frequency from said cellular radio telephone system controller.

19. The method of claim 11, wherein said rf data link comprises a fixed frequency rf data link.

20. The method of claim 16, wherein said rf data link comprises an unused voice channel.

* * * * *